(12) United States Patent
Baarman et al.

(10) Patent No.: US 9,312,728 B2
(45) Date of Patent: Apr. 12, 2016

(54) PHYSICAL AND VIRTUAL IDENTIFICATION IN A WIRELESS POWER NETWORK

(75) Inventors: David W. Baarman, Fennville, MI (US); William T. Stoner, Jr., Ada, MI (US)

(73) Assignee: Access Business Group International LLC, Ada, MI (US)

( * ) Notice: Subject to any disclaimer, the term of this patent is extended or adjusted under 35 U.S.C. 154(b) by 1599 days.

(21) Appl. No.: 12/763,622

(22) Filed: Apr. 20, 2010

(65) Prior Publication Data
US 2011/0043327 A1 Feb. 24, 2011

Related U.S. Application Data

(60) Provisional application No. 61/236,388, filed on Aug. 24, 2009.

(51) Int. Cl.
*G05B 19/00* (2006.01)
*H02J 17/00* (2006.01)
(Continued)

(52) U.S. Cl.
CPC .............. *H02J 17/00* (2013.01); *H02J 5/005* (2013.01); *H02J 7/025* (2013.01); *H04L 12/10* (2013.01)

(58) Field of Classification Search
CPC ........... H02J 5/005; H02J 17/00; H02J 7/025; H04L 12/10; H01L 35/00; H01M 10/443; H01M 8/04007; B60L 11/002; B60L 11/185; B60L 11/1801; B60L 11/182; B60L 2270/32; F01N 3/2006; B01F 5/0614; B01F 13/002; B01F 2215/0039; Y02T 90/121; Y02T 90/168; Y02T 10/26; Y02T 90/14; Y02T 90/128; Y02T 90/122; Y02T 90/16; Y04S 30/12; Y02E 60/50

USPC ........... 340/5.8, 5.81, 5.85, 10.34; 455/127.1, 455/343.1; 320/108, 109, 137; 322/2 R
See application file for complete search history.

(56) References Cited

U.S. PATENT DOCUMENTS 5,696,824 A 12/1997 Walsh
5,982,139 A 11/1999 Parise
(Continued)

FOREIGN PATENT DOCUMENTS

CN 1691603 A 11/2005
CN 1695283 A 11/2005
(Continued)

OTHER PUBLICATIONS

U.S. Appl. No. 12/652,053 titled Wireless Charging System With Device Power Compliance filed Jan. 5, 2010.
(Continued)

*Primary Examiner* — Anh V La
(74) *Attorney, Agent, or Firm* — Brinks Gilson & Lione

(57) ABSTRACT

A wireless charging system is disclosed. The wireless charging system includes a detector configured to identify device information related to a device to be powered at a location, a location processor coupled with the detector and configured to deliver location-specific information related to the location to the device to be powered based on the detected device information, a power supply in communication with the location processor configured to wirelessly provide power to the device based on the detected device information, such that the location processor is configured to deliver the location specific information to the device via a first channel, and wherein the power supply is configured to wirelessly provide power to the device via a second channel.

24 Claims, 11 Drawing Sheets

(51) Int. Cl.
*H02J 5/00* (2006.01)
*H02J 7/02* (2006.01)
*H04L 12/10* (2006.01)

(56) References Cited

U.S. PATENT DOCUMENTS

| | | |
|---|---|---|
| 6,798,716 B1 | 9/2004 | Charych |
| 6,870,475 B2 | 3/2005 | Fitch et al. |
| 7,020,701 B1 | 3/2006 | Gelvin et al. |
| 7,068,991 B2 * | 6/2006 | Parise ............... 455/343.1 |
| 7,612,528 B2 | 11/2009 | Baarman et al. |
| 7,987,360 B2 | 7/2011 | Luo et al. |
| 8,099,140 B2 | 1/2012 | Arai |
| 8,330,414 B2 | 12/2012 | Takahashi et al. |
| 2004/0130915 A1 | 7/2004 | Baarman |
| 2004/0150934 A1 | 8/2004 | Baarman et al. |
| 2006/0205381 A1 | 9/2006 | Beart et al. |
| 2006/0238365 A1 | 10/2006 | Vecchione et al. |
| 2006/0284593 A1 * | 12/2006 | Nagy et al. ............... 320/109 |
| 2007/0042729 A1 | 2/2007 | Baaman et al. |
| 2007/0075559 A1 * | 4/2007 | Sturt ............... 296/37.8 |
| 2007/0162337 A1 | 7/2007 | Hawkins et al. |
| 2007/0290792 A1 * | 12/2007 | Tsuchimochi et al. ...... 340/5.61 |
| 2008/0079392 A1 | 4/2008 | Baarman et al. |
| 2008/0157603 A1 * | 7/2008 | Baarman et al. ............... 307/104 |
| 2008/0172455 A1 * | 7/2008 | Masucci et al. ............... 709/203 |
| 2008/0205649 A1 * | 8/2008 | Harris et al. ............... 380/270 |
| 2008/0231211 A1 | 9/2008 | Baarman et al. |
| 2008/0258679 A1 | 10/2008 | Manico et al. |
| 2008/0309452 A1 * | 12/2008 | Zeine ............... 340/5.1 |
| 2009/0027203 A1 | 1/2009 | Cristache |
| 2009/0106567 A1 * | 4/2009 | Baarman ............... 713/300 |
| 2009/0174365 A1 * | 7/2009 | Lowenthal et al. ............ 320/109 |

FOREIGN PATENT DOCUMENTS

| | | |
|---|---|---|
| EP | 0 820 653 B1 | 2/1999 |
| EP | 1 758 304 A1 | 2/2007 |
| JP | 2001-359166 A | 12/2001 |
| JP | 2007-329983 A | 12/2007 |
| JP | 2008-503196 A | 1/2008 |
| JP | 2008-154446 A | 7/2008 |
| JP | 2008-295191 A | 12/2008 |
| WO | WO 96/32768 | 10/1996 |
| WO | WO 2004/038890 A1 | 5/2004 |
| WO | WO 2004/073176 A2 | 8/2004 |
| WO | WO 2008/056415 | 5/2008 |

OTHER PUBLICATIONS

PCT Search Report and Written Opinion, PCT/US2010/045727, Filed Aug. 17, 2010, Dated Oct. 20, 2010.
PCT Search Report and Written Opinion, PCT/US2010/040139, Filed Jun. 28, 2010, Dated Dec. 30, 2010.
Official Action (and Reasons for Refusal in English) dated Jun. 23, 2014 for Japanese Patent Application No. 2012-526839 (6 pp.).
First Office Action and Search Report (with English translation) dated Feb. 20, 2014 for China Patent Application No. 201080047882 (22 pp.).
First Office Action and Search Report (with English translation) dated Jan. 23, 2014 for China Patent Application No. 201080047884.6 (14 pp.).
Official Action (and Decision of Final Rejection) dated Jan. 13, 2015 for Japanese Patent Application No. 2012-526839 (4 pp.).
$2^{nd}$ Office Action dated Aug. 14, 2014 for China Patent Application No. 201080047884.6(6 pp.).
Decision on Rejection dated Jun. 8, 2015 for China Patent Application No. 201080047884.6 (21 pp.) (with English translation).

* cited by examiner

User ID Device Database

| Personal Identification | Device ID's | Device Types |
|---|---|---|
| USER ID | MFG-UNIQUE S/N-TYPE | MP3 Player |
| USER ID | MFG-UNIQUE S/N-TYPE | Camera |
| USER ID | MFG-UNIQUE S/N-TYPE | Cell Phone |
| USER ID | MFG-UNIQUE S/N-TYPE | Portable DVR |
| USER ID | MFG-UNIQUE S/N-TYPE | Bluetooth Headset |
| USER ID | MFG-UNIQUE S/N-TYPE | Laptop |

FIG. 8B

Coffee Shop Loyalty Tracking

| Location ID | Personal ID | Date | Time | Spend | Offer No. | Order No. |
|---|---|---|---|---|---|---|
| COFFEE SHOP-CITY-STORE NO-AREA | USER ID | 1/10/2009 | 7:10am | $7.40 | | UNIQUE NO. |
| COFFEE SHOP-CITY-STORE NO-AREA | USER ID | 1/11/2009 | 7:10am | $12.50 | | UNIQUE NO. |
| COFFEE SHOP-CITY-STORE NO-AREA | USER ID | 1/12/2009 | 7:10am | $7.40 | | UNIQUE NO. |
| COFFEE SHOP-CITY-STORE NO-AREA | USER ID | 1/13/2009 | 7:10am | $10.22 | | UNIQUE NO. |
| COFFEE SHOP-CITY-STORE NO-AREA | USER ID | 1/14/2009 | 7:10am | $21.32 | | UNIQUE NO. |
| COFFEE SHOP-CITY-STORE NO-AREA | USER ID | 1/15/2009 | 7:10am | $7.90 | OFFER NO. | UNIQUE NO. |
| COFFEE SHOP-CITY-STORE NO-AREA | USER ID | 1/16/2009 | 7:10am | $10.23 | | UNIQUE NO. |
| COFFEE SHOP-CITY-STORE NO-AREA | USER ID | 1/17/2009 | 7:10am | $7.40 | | UNIQUE NO. |
| COFFEE SHOP-CITY-STORE NO-AREA | USER ID | 1/18/2009 | 7:10am | $10.23 | | UNIQUE NO. |
| | | | | $94.60 | | |

FIG. 8C

PHYSICAL AND VIRTUAL IDENTIFICATION IN A WIRELESS POWER NETWORK

PRIORITY CLAIMS

This patent document claims the priority benefit provided under 35 U.S.C. §119(e) to U.S. Prov. Pat. App. No. 61/236,388, titled "WIRELESS POWER DISTRIBUTION AND CONTROL SYSTEM," filed on Aug. 24, 2009. The content of this provisional patent application is incorporated herein by reference for all purposes.

CROSS-REFERENCE TO RELATED APPLICATION

This patent document is related to commonly owned:

U.S. Pat. Pub. No. 2008/0231211, titled "POWER SUPPLY,"

U.S. Pat. Pub. No. 2008/0157603, titled "INDUCTIVE POWER SUPPLY WITH DEVICE IDENTIFICATION,"

U.S. Pat. Pub. No. 2008/0079392, titled "SYSTEM AND METHOD FOR INDUCTIVELY CHARGING A BATTERY,"

U.S. Pat. Pub. No. 2007/0042729, titled "Inductive power supply, remote device powered by inductive power supply and method for operating same,"

U.S. Pat. Pub. No. 2004/0150934, titled "ADAPTER," and

U.S. patent application Ser. No. 12/652,053, titled "WIRELESS CHARGING SYSTEM WITH DEVICE POWER COMPLIANCE" filed on Jan. 5, 2010.

The entire contents of these patent applications and/or the corresponding published patent applications are incorporated herein in their entirety for all purposes.

TECHNICAL FIELD

This patent document generally relates to wireless power delivery systems and more specifically to the physical and virtual identification of devices in a wireless power delivery system.

BACKGROUND

There is a significant and continually increasing need for widely available power, particularly in the field of consumer and business electronics, due to the proliferation of laptop computers, cell phones, music players, personal digital assistants and other self-powered rechargeable portable/remote devices that require periodic charging. In many public places, power may not be readily available to the general public because of the need for a power outlet for a wired connection. In the past, squatters may have plugged their devices into any available outlet and used power from the owner of the outlet. As devices become more power hungry the availability of outlets and the need for more power have become more common. The number of devices and the volume of usage per person further exacerbates the need for power. Electric vehicle charging now uses standard outlets, which contribute to the power supply needs of the public. Known power delivery systems are not be able to meet the demands for conveniently delivering power and other information.

BRIEF DESCRIPTION OF THE FIGURES

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIGS. 8B and 8C illustrate an exemplary user identification database and an exemplary customer loyalty database;

DETAILED DESCRIPTION

There is a significant and continually increasing interest in wireless power deliver/supply systems to satisfy consumers' needs for convenient power access. Wireless power supply systems provide a variety of benefits over conventional wired connections. Most notably, they eliminate the need for various charging cords and the need to repeatedly plug in and unplug electronic devices for recharging, thereby reducing cost and improving ease and convenience of use. Publicly available wireless charging may be very convenient and useful for consumers; and may provide retailers or vendors with an opportunity to directly target and market additional services and products that may be of interest to the consumer.

By way of introduction, the disclosed embodiments relate to systems and methods for providing location-specific information to consumers of a wireless power system. In one embodiment, the device requiring power manually or automatically connects and communicates with a wireless power or charging station provided by a power provider. The device and the wireless power station provide unique identification information which may, in turn, be linked to a virtual account (or accounts) associated with the owner of the device and the operator or location of the wireless power station. The device may further be required to provide a password and/or communicate in an encrypted manner to allow for secure access to the virtual account, billing information and/or payment method. Upon establishing an encrypted or secure connection or an unencrypted or unverified connection, the wireless power or charging station and more specifically the wireless power connection may operate as a channel or conduit to provide additional information, offers and benefits to the consumer via their device.

In an alternate embodiment, the conduit may be established using the communications capabilities of the device. For example, the channel or conduit may provide additional information, offers and benefits to the consumer via their device utilizing existing cellular, Wi-Fi, Bluetooth, WiMax or other communication capabilities of the device. In another embodiment, the conduit or communications channel may be utilized to reprogram, upgrade or otherwise modify the device to add or change functionality. For example, the conduit or communications channel may be utilized by audio visual components to provide control codes to a universal remote, cell phone or personal digital assistant to allow the device to control the components. Further examples of this may be found in U.S. Prov. Pat. App. No. 61/236,388, titled "WIRELESS POWER DISTRIBUTION AND CONTROL SYSTEM," filed on Aug. 24, 2009. In this way, linked device, location and virtual account information may be verified and confirmed utilizing, for example, an application with configurable security, thereby increasing the value of the information to the consumer, retailers and other users and providers.

Figure 1:
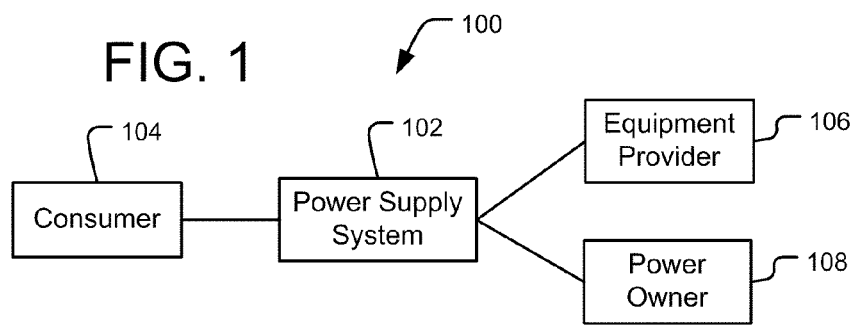
FIG. 1 illustrates a charging system.

FIG. 1 illustrates a wireless charging and communication system 100. The charging system includes at least one consumer 104 accessing a power supply system 102. The power supply system 102 may provide wireless power to the consumer 104 in exchange for a payment. Alternatively, the power supply system 102 may provide power to the consumer 104 in conjunction with a loyalty or rewards program based on, for example, the type of product purchases, the quantity of the purchase, the amount of the purchase, frequency and location of visits, other special offers and/or at a reduced rate, price or combinations thereof. The power supply system 102 may be provided, maintained, and/or controlled by an equipment provider 106, such as the owner or manager of a private, public or limited public space, and/or a power owner or supplier 108, such as an independent franchise owner or an electrical utility. The consumer 104 may have a device, such as a cellular phone or laptop computer, that includes a battery, super-capacitor or other power storage mechanism that must be recharged or that requires a power supply for operation. The system 100 is further configured to share basic identification information that, in turn, can be references and utilized independently or in conjunction with network or virtual account information. It will be appreciated that the disclosed embodiments may be used to supply power to operate devices that do not have internal power storage means and require delivery of operating electrical power at the time of operation. Throughout this disclosure the term charge may be used to include providing power for recharging a battery or super-capacitor as well as providing or delivering power for reasons other than charging an energy storage component, such as powering the device. The power supply system 102 may provide the consumer 104 and an associated device 206 (see FIG. 2) with power to charge or otherwise operate the device 206. As described, the power or energy may be delivered as an electric current (AC or DC) that is passed from an electrical outlet or supply terminal to wirelessly power the device 206.

The power supply system 102 may provide power wirelessly to the consumer 104. The power may be provided through induction that generates an electrical current in the consumer's device that charges or powers the device. Wireless power transfer is further described in commonly owned U.S. Pat. Pub. No. 2008/0231211, titled "POWER SUPPLY," which is hereby incorporated by reference.

The power supply system 102 may be located at a location owned by the power owner 108. In one embodiment, the power owner 108 may be a electricity distributor, such as an infrastructure owner who provides power through the power supply system 102. The power owner 108 may utilize the equipment provider 106 for providing power to the consumer 104, but also to receive payment for that power. The equipment provider 106 may be a manufacturer of products, such as furniture, that are produced with the power supply system 102 built in. For example, airport seating, airplane seating, desks, auditoriums, or kiosks may be manufactured to include the power supply system 102. Since the power owner 108 may want to account for or recoup the expense for the power it provides to others, it may seek to utilize equipment from the equipment provider 106 that have the power supply system 102, as a way to provide power and receive payment for it. The equipment provider 106 may control and maintain the power supply system 102 under an agreement with the power owner 108, or the power owner 108 may control and maintain the power supply system 102. In one example, the power owner 108 may include the equipment provider 106 as a single entity. It should also be noted that the power supply system 102 may also be deployed at a location for short power cycles and an authenticated information exchange. An example of this is a simple hot spot by a door to allow this system 100 and device 206 to act as a door lock, or a where-are-you-now marker that communicates location information to the device 206 to verify your location.

Figure 2:
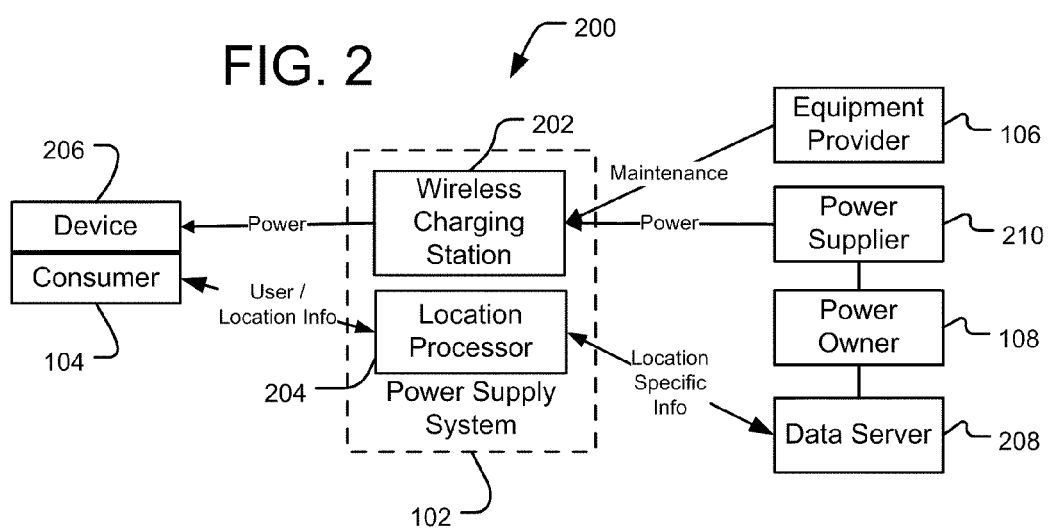
FIG. 2 illustrates an alternative charging system.

FIG. 2 illustrates an embodiment of a wireless charging system 200 configured to provide physical and virtual identification. The exemplary charging and identification system 200 is configured to wirelessly provide power or charge to a consumer 104 and more specifically to a consumer device 206. The power supply system 102 includes wireless charging station 202 and a location processor 204. The consumer device or device 206 may be any electronic device or system configured to receive a wireless charge. For example, the device 206 may include a battery (not shown) and the hardware and/or software necessary to wirelessly receive operating power and/or a battery charge via the wireless charging station 202. The device 206 may include a cellular telephone, a Smartphone, Blackberry®, personal digital assistant (PDA), notebook/laptop computer, netbook, portable multimedia player (playing video/audio files, Blu-Ray, DVDs, CDs, etc.), video game player (e.g. Gameboy®, Playstation Portable®), mp3 player, iPod®, iPad® or any other device that may utilize a charge or power source. In another example, the device 206 may be a lighting element or bulb (not shown) configured to wirelessly receive power via the wireless charging station 202 in order to operate and provide illumination.

The device 206 may be configured to wirelessly couple to the power supply system 102 to receive power. For example, the device 206 may be fitted with, or coupled to, an adapter (not shown) that includes the hardware and/or software required to receive wireless power from the power supply system 102 and/or the wireless charging station 202. The wireless charging station 202 may be manufactured with the hardware and software necessary for wireless power distribution or may be fitted with an adaptor (not shown) to provide or enable the desired functionality. In this example, the adapter coupled to the power supply system 102 may further connect to a standard electrical outlet in order to receive wired power and, in turn, wirelessly transmit the received power the device 206. In alternate embodiments, an adaptor may be configured to identify and/or provide power to multiple devices simultaneously. For example, the adapter may include multiple plugs or connectors configured to cooperate with different devices in order to effect a wireless power transfer. The wireless power transfer and adapter may be further described in U.S. Pat. Pub. No. 2004/0150934, entitled "ADAPTER," which is hereby incorporated by reference.

The power supply system 102 may perform other functions in addition to wirelessly delivering power to a consumer device 206. The power supply system 102 may include a data server 208 configured to accessibly store geographic or location-specific information such as, for example, advertisements, coupons, loyalty points or information, weather information, local or nearby information or attractions, tourist information and travel or site information. The data server 208 may be coupled to, or in communication with, the location processor 204 to receive and process device information such as a unique device identifier, a serial name, a user name or other identification from the device 206. The data server 208 may be a part of, or separate from, any of the power supplier 210, the power owner 108, or the equipment provider 106. Alternatively, the data server 208 may be maintained at a different location or a part of a third party system provided by, for example, a marketing or advertising entity (not shown). The data server 208 may further operate as an authentication processor to verify, confirm correlate the received device and location information with virtual account information 304 stored therein which can be created in one or more systems. For added security, a credit system may store personal data and password information at a first location or server and credit provider password information at a second location or server.

The wireless charging station 202 may include an interface that provides wired or wireless access to the power at a particular location (presumably owned by the power owner 108) and provided by a power supplier 210. The interface may be an application resident or running on the device 206 or may be a GUI presented by the wireless charging station 202. Alternatively, the interface may be accessed by the device 206 after a physical connection is made between the device 206 and the wireless charging station 202. The physical or wired connection may initiate or authorize the information exchange as well as the wireless power transfer. Moreover, the physical or wired connection may be used to deliver power to the device 206 from the wireless charging station 202. The wireless charging station 202 may identify the device that is being charged as described in, for example, U.S. patent application Ser. No. 12/652,053, entitled "WIRELESS CHARGING SYSTEM WITH DEVICE POWER COMPLIANCE" filed on Jan. 5, 2010, and U.S. Pat. Pub. No. 2008/0157603, entitled "INDUCTIVE POWER SUPPLY WITH DEVICE IDENTIFICATION," both of which are hereby incorporated by reference.

In another embodiment, the power supply system 102 may further include a separate detector (not shown) in communication with the location processor 204 that is configured to identify the device 206. In other words, the detector may be a part of the power supply equipment 202, or may be a separate component that connects with and provided the identity of the device 206. The device information or identity may, in turn, be utilized by the location processor 204 and/or the offer database to determine a virtual account associated with the consumer 104.

As described below, the power supply equipment 202 provides wireless power to the device 206. The wireless power may be transmitted to the device 206 in conjunction with or separately from the transmission of location-specific information from the location processor 204 to the device 206. For example, the communication of device information may be utilized by the wireless charging station 202 to authenticate and/or initiate the wireless transmission of power. Alternatively, the communication of device information may operate independently of the wireless power transmission to control and direct the communication of location-specific information from the data server 208 and location processor 204 to the device 206.

Figure 3:
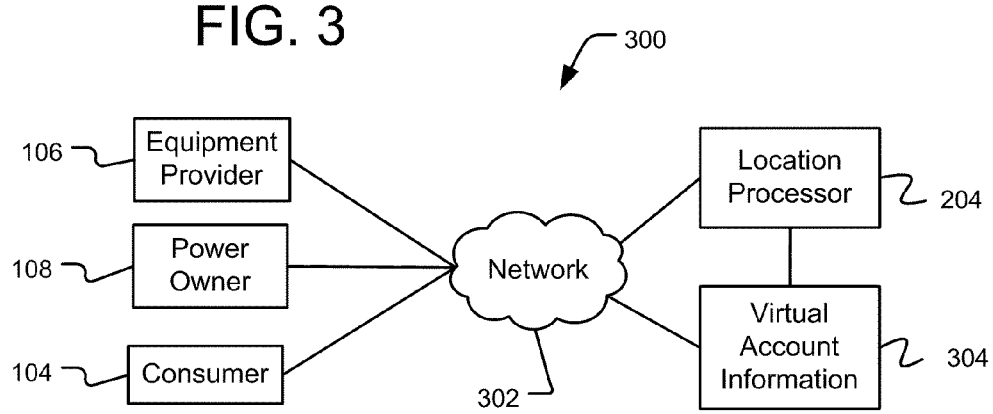
FIG. 3 illustrates a communications and charging network for physical and virtual identification.

FIG. 3 illustrates a communications and charging network for providing location-specific information 300. The location processor 204 communicates with the consumer 104, the equipment provider 106, and/or the power owner 108 in order to link or otherwise correlate the physical location of the device 206 with a virtual account associated therewith. The consumer 104 (or the consumer's device 206), equipment provider 106, and power owner 108 may all be connected with the location processor 204 through a network 302. The network 302 may connect any of the components to enable communication of data and may include wired networks, wireless networks, or combinations thereof. The wireless network may be one or a combination of a cellular telephone network, a network operating according to a standardized protocol such as IEEE 802.11, 802.16, 802.20, published by the Institute of Electrical and Electronics Engineers, Inc., or WiMax network. Further, the network 302 may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network 302 may include any communication method or employ any form of machine-readable media for communicating information from one device or entity to another. For example, the consumer 104 may submit a password, device identification or other authentication over the network 302 to the location processor 204. The location processor 204 may be coupled with additional networks or databases configured to store virtual account information for the consumer 104, the power supply system 102 and/or the location of the wireless charging station 202.

As previously discussed, virtual account information 304 may also be accessed over the network 302. For example, the virtual account information 304 may be stored in a network accessible server or database such as the data server 208 or the location processor 204. The virtual account information 304 may include a username and password associated with the consumer 104. The virtual account information 304 may be associated with a particular power supply system 102 which, in turn, may be provided by a specific retailer or retail chain. For example, the virtual account information 304 may include information related to a customer reward program which provide benefits to encourage customer loyalty. Moreover, the virtual account information 304 could include information related to other partner retailers or other retail locations within the chain.

The virtual account information 304 may be utilized to analyze or track the shopping and buying habits of the consumer 104 to allow specific offers, deals or related products to be communicated to the device 206. For example, if the consumer 104 purchases a product during a visit to a retailer, the consumer 104 may be suggested accessories to the product or coupons for upgrades, accessories or other related products. In addition, the consumer 104 may access offers extended from the retailer through a virtual account such as a web page. The virtual account information 304 may further include customer demographics, devices owned, payment processing data, credit card or other account information, telephone number, or other information related to the consumer 104 and/or the device 206.

In another embodiment, the virtual account information 304 may be a third party service to which multiple retailers could subscribe. For example, the virtual account information 304 could be linked to a social network to allow product reviews to be shared amount related groups of consumers 104. Alternatively, the virtual account information 304 could include account information for different retailers offering different products and services to allow for cross-selling opportunities.

In yet another embodiment, the virtual account information 304 could include secure and/or encrypted information which may be verified by the data server 208 acting as an authentication processor. For example, the virtual account information 304 may be securely linked to a bank account or credit card to allow the consumer 104 to pay for merchandise or services via the device 206. The virtual account information 304 may be accessible and editable to the consumer 104 through a web interface via the network 302.

Moreover, the virtual account and virtual account information 304 may be utilized to alert the consumer 104 via their device 206 of charges made against their credit card, virtual account or other debit account. In this way, the consumer 104 may be made aware of any potentially fraudulent or unauthorized purchase. The device 206 may further include an application configured to the bank or credit card company immediately of the suspicious activity and request a new password, encryption code, or a new account number. The application may further allow the consumer 104 to create a new encrypted physical device ID and upload that new ID to be linked with the bank or credit account identified in their virtual account. The consumer 104 may be able to control the level of notifications through a setup screen (either on the device 206 or on a secure bank web site). For example, the consumer 104 may choose a threshold purchase amount, above which they will receive the notification message on their smart phone.

The virtual account information 304 in this exemplary embodiment is illustrated as a single logic entity; however, it will be understood that individual components or elements of the virtual account information 304 may be stored in different, communicatively connected, databases accessible via the networks 302. For example, virtual account information related to a retailer or group of retailers may be stored in one database, while virtual account information for the consumer 104 may be stored in a different database and the account or payment information may be stored in a third secure database. In this way, each database or portion of a database may be defined with different access level and/or security while still allowing for the convenient transfer of information between authorized parties and/or entities.

Figure 4:
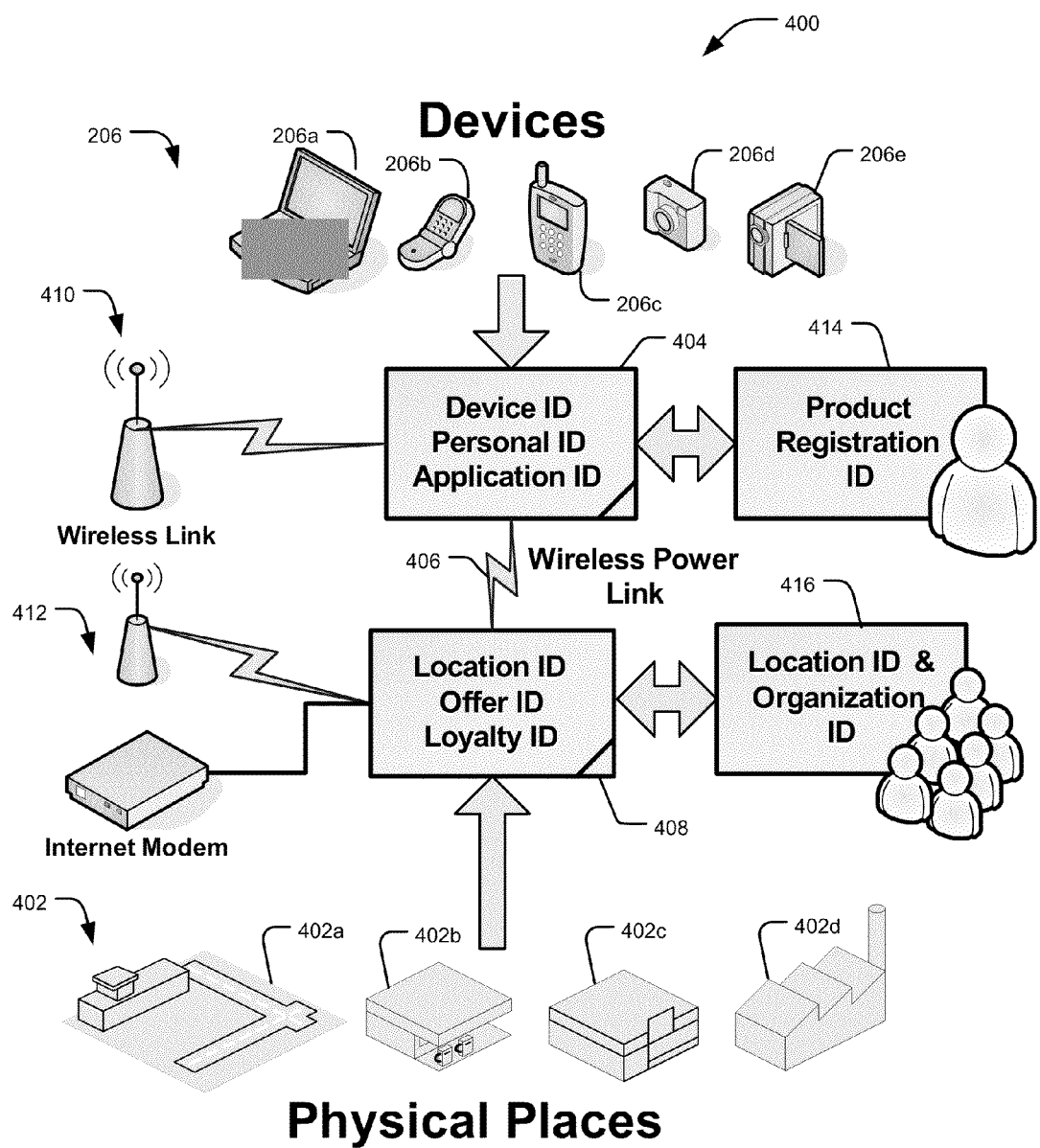
FIG. 4 illustrates an exemplary embodiment of a communications and charging network configured to provide location-specific information as disclosed herein.

FIG. 4 illustrates an exemplary embodiment of another communications and charging network for providing location-specific information 400 configured to link devices and their associated users to one or more virtual accounts based on their physical location. For example, the identification system 400 may include one or more devices 206 configured to interact with one or more physical locations 402. The devices 206 may include, for example, a laptop or PDA 206a, a cell phone 206b, a global positioning system (GPS) device 206c, a digital camera 206d and/or a digital video camera 206e or any other device configured to receive power wirelessly and/or to communicate wirelessly. Similarly, the physical locations 402 may include, for example, an airport or other mass transit terminal 402a, a gas station 402b, a school or retail location 402c, an office or factory 402d or any other location that includes or provides a wireless charging station 202.

The identification system 400 may, when one of the devices 206 comes into contact and/or communication range of a wireless charging station 202 deployed at one of the physical locations 402, initiate an information transfer. For example, as the wireless charging station 202 begins providing power to the device 206 via a wireless inductive transfer; an information exchange may be carried out. The information exchange may be accomplished via the wireless or inductive power link or channel, or via a Bluetooth, WiFi, cellular connection provided by the device 206. In particular, the device 206 may, as shown at block 404, communicate a device identification (ID), a personal ID and/or an application ID via a wireless power link 406 or other communication or network link. The communicated information may be received by, for example, the location processor 204 and correlated with, as shown in block 408, a location ID, an offer ID and/or a loyalty ID associated with one or more of the physical locations 402a to 402d represented by the communicated identification information. Communication modules or systems 410 and 412 may be coupled to the device 206 and the wireless charging station 202 deployed at one or more of the physical locations 402 for communication with, for example, the data server 208. The communication modules or systems 410 and 412 may be wired or wireless devices that respectively provide the devices 206 and physical locations 402 a conduit for updating the data server 208.

In operation, the cell or smartphone 206b may come into range of a retail location 402c and an information exchange may be automatically or manually initiated. In addition to the exchanged identification information, the wireless power link 406 may be utilized to exchange information on the transaction or services provided by the retail location 402c. For example, if a product is purchased at the retail location 402c, the product registration information, as shown in block 414, may be communicated to the data server 208. Alternatively or in addition to, and as shown in block 416, the data server 208 may be queried for delivery information related to the consumer 104, the physical location 402, any special offers related to the purchased product or service, and/or information related to nearby events or places of interest. In this way, the wireless charging station 202 may be utilized to provide power to devices as well as providing enriching and/or value-added information to the consumer 104. Data and power may be exchanged via different communication channels established between the device 206 and the wireless charging station 202. For example, data and/or power may be exchanged via a first communication channel while data or other information and alerts may be exchanged via a second, independent, communication channel. Alternative, data and power may be communicate via the same communication channel by modulating or otherwise encoding the data within the power transfer signal or vice versa. It is becoming more popular for cell phone and GPS devices and associated services to provide wireless information about services at the customer's present location. These notifications may include information about where the customer is able to find the wireless charging station 102. This also allows additional combined offers and recommendations to be made with past history being applied to new visits, locations and options presented to the consumer.

Figure 5:
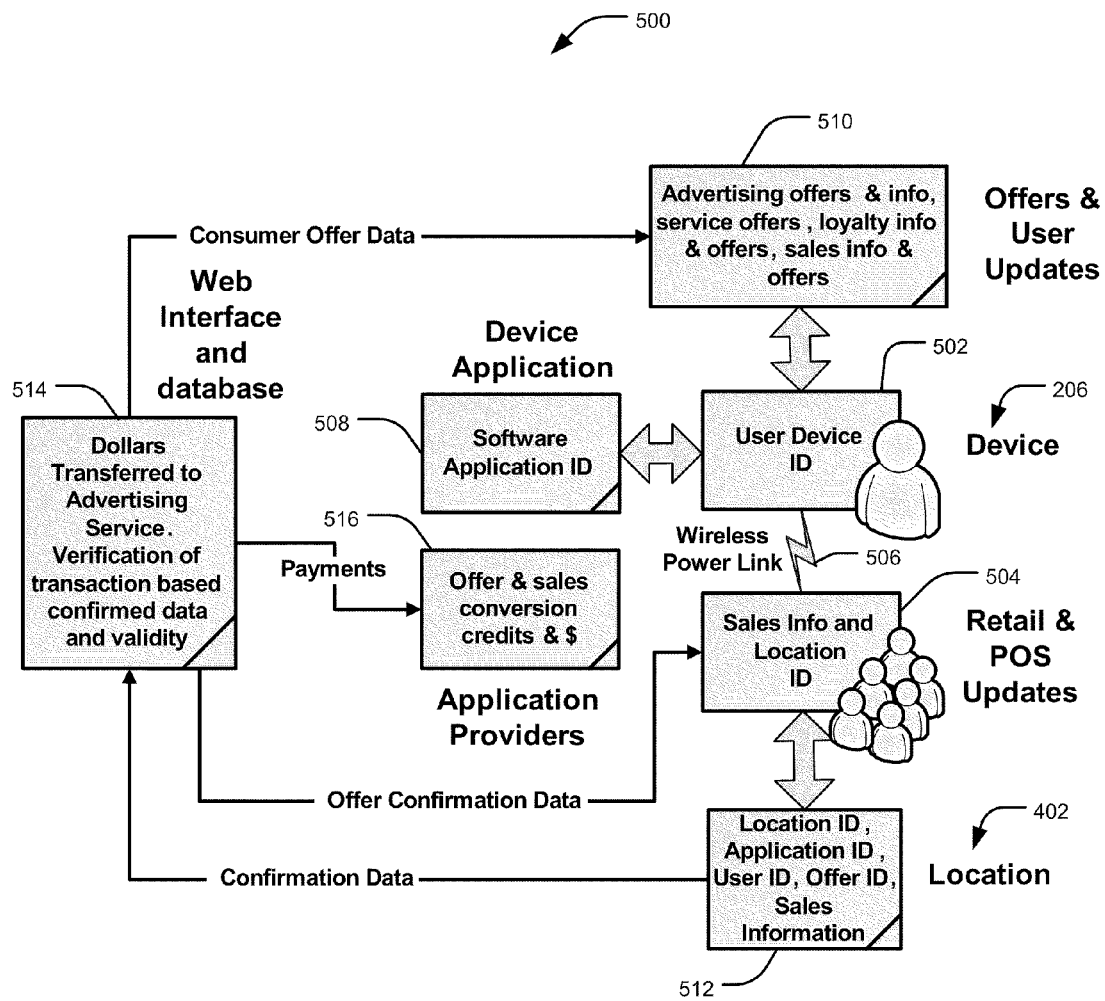
FIG. 5 illustrates an exemplary embodiment of a communications and charging network configured to provide location-specific information in an electronic advertising system.

FIG. 5 illustrates another embodiment of a communications and charging network for providing location-specific information 500 configured to link devices and their associated users to one or more virtual accounts based on their physical location and deliver targeted advertising based on the established links. As previously discussed, the device 206 may, when in range of the wireless charging station 202, communicate and exchange a device identification (see block 502) and a sales and location identification (see block 504) associated with the physical location 402 via the wireless link 406. In this way, the identification system 500 may determine that the consumer 104 and the device 206 are at or in range of the physical location 402.

The device 206, in this embodiment, may include or execute a software application (as shown in block 508) to manage and protect data transfers such as, for example, electronic fund or payment transfers, device and personal information transfers. In this embodiment, the consumer 104 is assumed to have conducted a transaction via the device 206 (with or without the software application 508). Thus, the location processor 204 has received and linked the device identification 502 and the location identification 504. The location processor 204 may query a location virtual account (see block 512) stored on the data server 208 (or otherwise accessible) to determine and offer location-specific information (see block 510) to the device 206 and the consumer 104. In this example, the location-specific information 510 may be advertising offers that may or may not be related to the product or service that was the basis of the transaction. The location-specific information 510 may further includes service information, customer loyalty and reward information, sales information, coupons and other offers. The location-specific information 510 may be displayed or accessible directly via the device 206 or via the software application 508. The data server 208 alone, or in cooperation with, the location processor 204 may track the type any frequency of the location-specific information 510 provided to the device 204. The data server 208 alone or in cooperation with the location processor 204 may further verify the transaction and exchanged information (see block 514). The data server 208 alone or in cooperation with the location processor 204 may further debit or credit advertisers and the consumer 104 based on the delivered and/or utilized location-specific information (see block 516).

Figure 6:
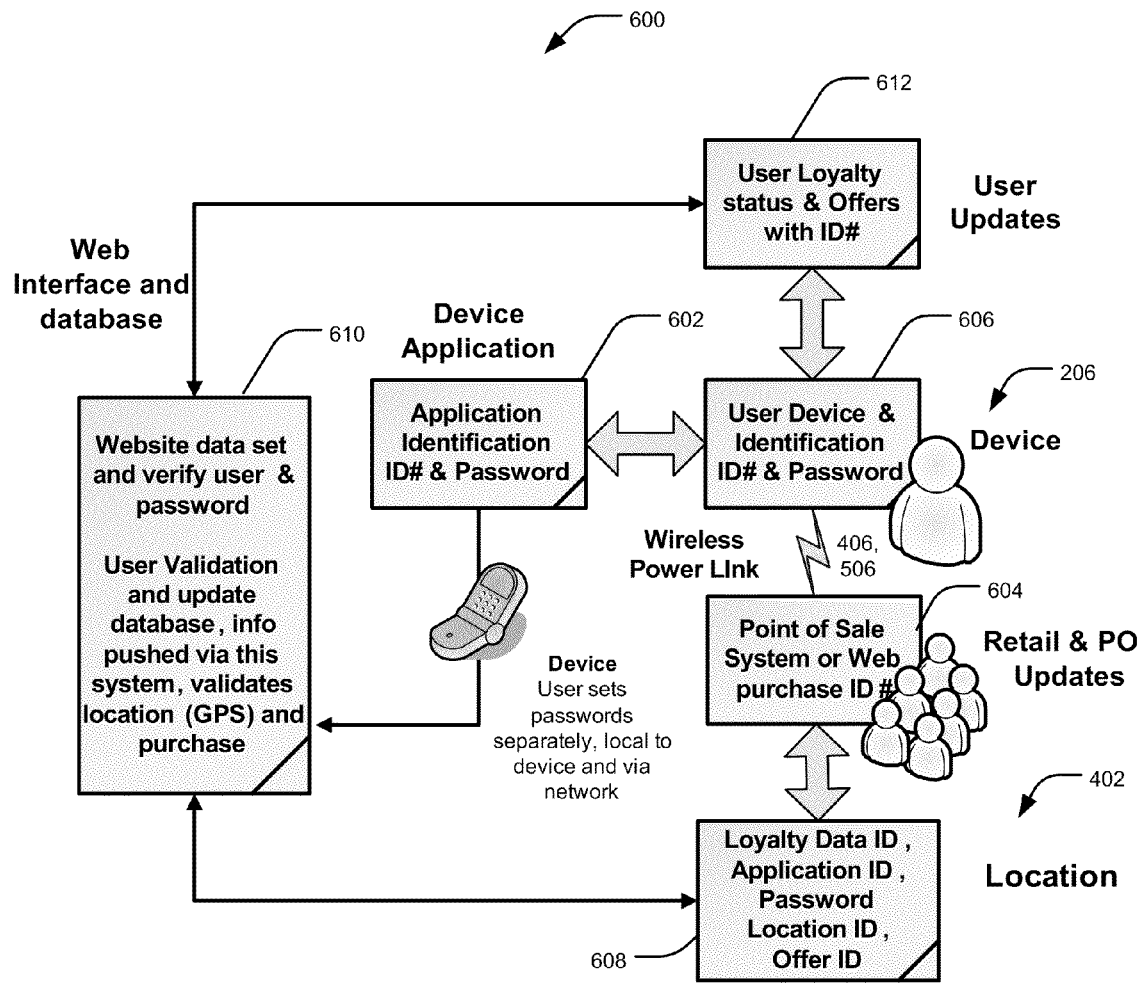
FIG. 6 illustrates an exemplary embodiment of a communications and charging network configured to provide location-specific information in a credit processing system.
Figure 7:
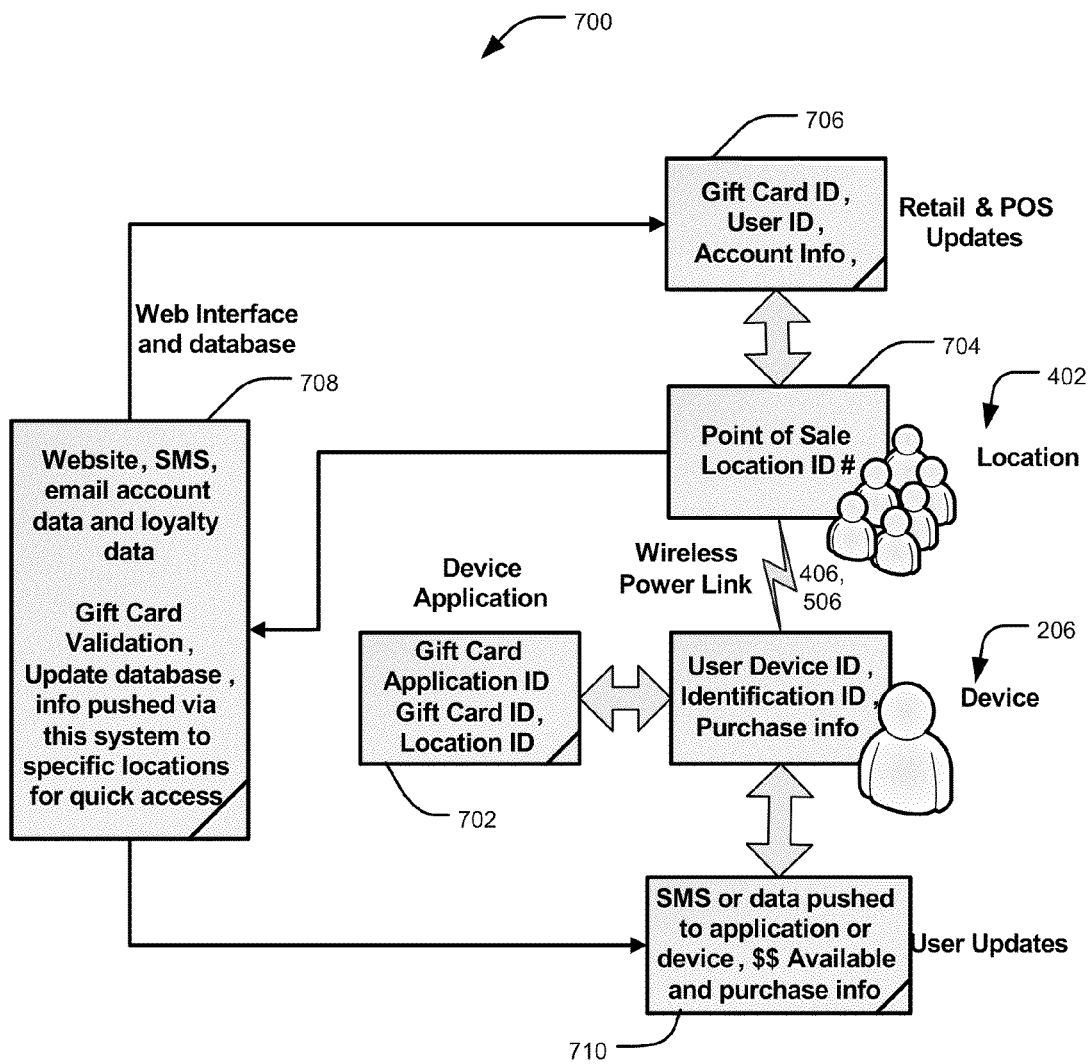
FIG. 7 illustrates an exemplary embodiment of a communications and charging network configured to provide location-specific information in a gift card processing system.

FIGS. 6 to 8 illustrate alternate embodiments of communications and charging networks 600, 700 and 800 for providing location-specific information. As previously discussed in connection with FIGS. 4 and 5, the device 206 and the physical location 402 communicate and exchange location information via the wireless power link 406. FIG. 6 illustrates an embodiment in which device 206 is presumed to include and execute a bill payment or transaction application (see block 602) operable within the communication and charging network 600. The application 602 may be configured to provide for password protected and secured financial transactions. For example, the application 602 may be configured to access the consumer's 104 credit or bank account to affect payment at a point-of-sale device (see block 604) contained at the physical location 402. The consumer 104 may enter or provide a password to the device 206 and the application 604 may initiate or authorize payment for the goods or services provided at the physical location 402.

The communication and charging network 600 may, in response to the password or authentication, attempt to confirm the transaction. For example, the data server 208 may access virtual accounts for both the consumer 104 and the location 402 (see blocks 606 and 608, respectively) to attempt to identify and verify the transactions. The device and location identification information within the virtual accounts as well as additional password, identification and position information may be provided to the data server 208 and/or the location servers 202. The data server 208 and/or the location servers 202 may, in turn, confirm stored location information with the present location of the device 206, update stored information and confirm stored user credentials (see block 610). The data server 208 and/or the location servers 202 may further communicate updated loyalty point information, sales offers and/or confirmation to the device 206 (see block 612).

FIG. 7 illustrates the communication and charging network 700 configured to process electronic gift card information provided via the device 206 and/or an application (see block 702) executed thereby. For example, in order to complete a transaction for goods or services, the consumer 104 may provide or authorize transmission of gift card information via the application 702. The gift card information may be communicated by the wireless link 406 to a point-of-sale device (see block 704) at the location 402. The received information 304 may be correlated against stored virtual account information containing the consumer's payment information, account information and/or user or device identification (see block 706). The gathered and correlated information may be communicated to the data server 208 where the gift card information can be confirmed, account information updated and confirmation alerts, messages, texts, etc, (see block 708) can be communicated to the point-of-sale device at block 704 and/or the virtual user account (see block 710). The information provided at block 710 may be used to update the device 206 and application 702 with, for example, a remaining gift card balance, purchase confirmation, store location or other pushed information from the data server 208.

Figure 8A:
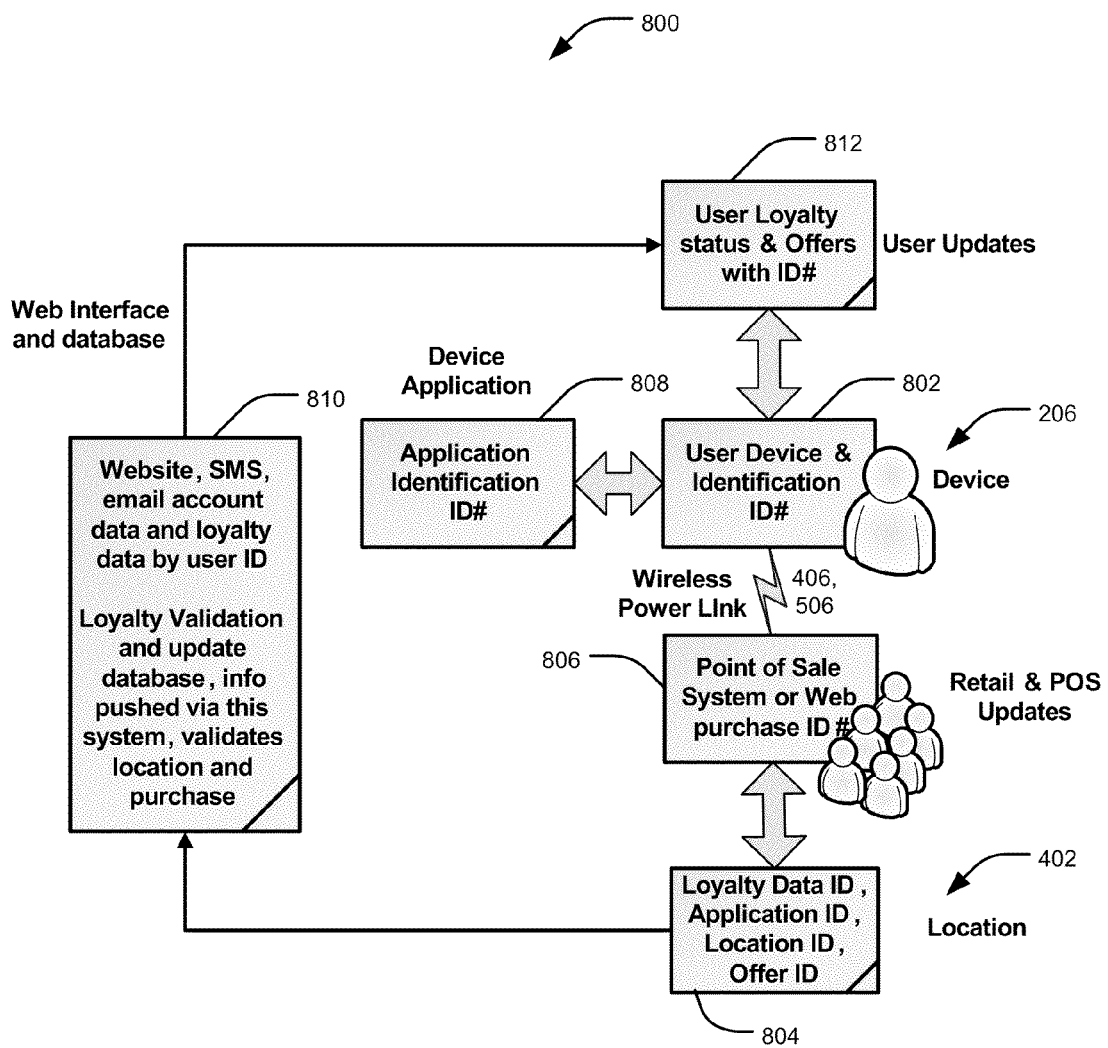
FIG. 8A illustrates an exemplary embodiment of a communications and charging network configured to provide location-specific information in a customer loyalty system.

FIG. 8A illustrates the communication and charging network 800 configured to implement a loyalty tracking and/or rewards program based on link device and location information provided via the device 206 and wireless charging station 202. As previously discussed and shown at blocks 802 and 804, device information and location information may be exchanged via the wireless link 406 and a point-of-sale system (see block 806). Alternatively or in addition to, the device 206 may employ a software or security application to control access to the consumer's loyalty identification, password(s) and/or other personal information (see block 808). In this way, when a device 206 and consumer are within range of the wireless charging station 202, device and location information (see blocks 802 and 804) may be linked and exchanged therebetween. Thus, the communication and charging network 800 can confirm the presence of the device 206, and presumably the consumer 104, at the location 402 and reward or loyalty points may be awarded (see block 810). At block 812, the rewarded or updated loyalty information may be communicated to the device 206 along with any offers or other location-specific information. It should be noted that reward or loyalty points may be awarded based on the exchange of information, when a transaction is completed or a combination of thereof.

FIGS. 8B and 8C illustrates information that may be exchanged and eventually correlated. FIG. 8B illustrates a user device identification database 820 that includes personal identification or user information 822, a corresponding unique device information or identifier 824 and an associated device type 826. The user device identification database 820 may be stored in the location processor 204 and/or the data server 208. FIG. 8C illustrates a loyalty tracking database 840 for an exemplary coffee shop. The loyalty tracking database 840, in this exemplary embodiment, location information or identification 842 is correlated with personal identification or user information 822. The loyalty tracking database 840 may further track the date 844, time 846 and amount 848 of transactions associated with the location information 842. Offer information 850 and order information 852 may further be stored and correlated based on location information 842 and the personal identification or user information 822. In this way, user patterns and purchasing habits, offer history and other patterns may be determined and evaluated.

The device 206 in some embodiments may or may not include networking or communication capabilities. If the device 206 does not include additional communication capabilities, and information is not communicated via a wireless power link, then transaction records and updates may be stored locally on the device 206. In this way, information and records may be stored on the device 206 until and alternate communication mechanism or method may be established. For example, transaction records and updates may be stored within the device 206 until a wired communication link is established allowing information to be uploaded or provided to the location processor 204 and/or the data server 208.

The device 206 may in other embodiments be configured to communicate and cooperate with a wireless charging station 202 deployed or integrated within an automobile. For example, when the consumer 104 is within range of the automobile, the wireless charging station 202 may inductively couple with the device 206 to wirelessly deliver power. The device 206, as previously discussed, may include a software application configured to allow the device 206 and the automobile to exchange and authenticate information. In this way, the automobile and the device 206 may communicate and confirm identity information that, in turn, may allow location-specific information to be exchanged via the wireless power link. The location-specific information could, in this exemplary embodiment, be commands and information related to the automobiles environmental controls or entertainment controls. For example, the consumer 104 may use the application loaded onto the device 206 to control music or video displayed within the automobile, or to control the climate within the automobile. Alternatively, the location-specific information exchanged via the wireless power link could be used to access the automobiles locks and/or ignition. The automobile may be configured to provide power to, and receive input from, multiple devices via the wireless charging station 202 deployed therein. Multiple devices may allow passengers to control adjust individual climate control or entertainment settings. Moreover, the activities of each of the multiple devices may be tracked and stored via their interaction with the wireless charging station within the automobile.

In another embodiment, device 206 may be the automobile (as opposed to a device within an automobile). The device 206, e.g., the automobile in this embodiment, includes or is assigned a unique physical ID code or device identification. The power supply 102 may be installed or deployed in a public or private parking structure and configured to communicate with the automobile. For example, in this embodiment, the device 206 may provide the physical ID code associated with the automobile to authenticate account information, authorize power delivery and link the physical ID code or information to the virtual user account and the equipment provider/power owner (e.g., location) virtual account. The automobile (device 206 in this embodiment) may further include data uplink capabilities through a cellular or WiFi network. Alternatively, the automobile may communicate through the power supply 102 to the network 302.

Figure 13:
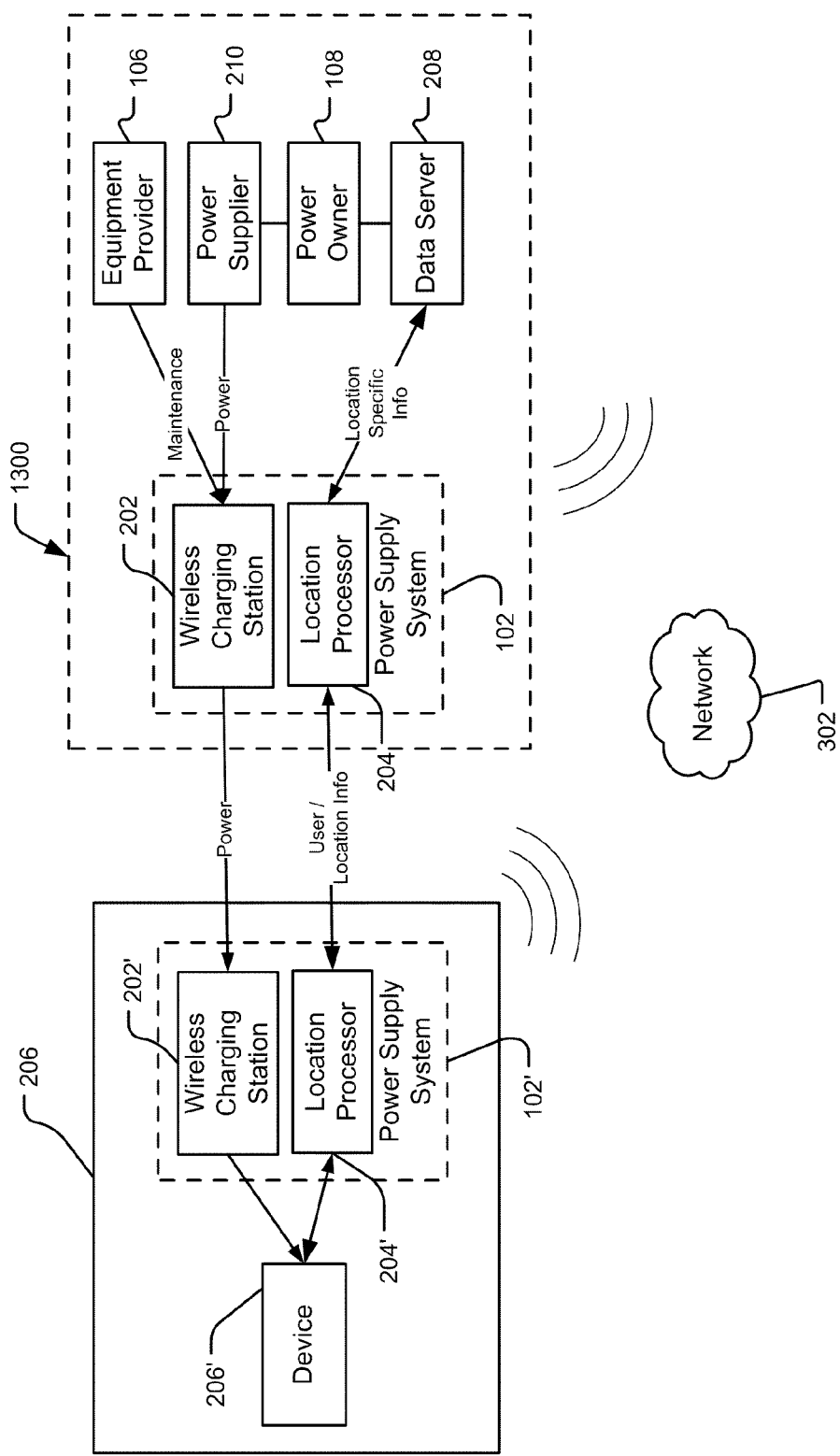
FIG. 13 illustrates an embodiment of a cascading communications and charging network for physical and virtual identification.

FIG. 13 illustrates another embodiment in which the power supply 102 may be deployed in a cascading manner with one or more other power supplies 102'. For example a first power supply may be located in a parking structure 1300 with communicates with and charges an electric vehicle. The vehicle may contain a second power supply 102', for example in the dash board or console, that communicates with an at least one secondary device 206' such as cell phones, MP3 players or other device carried within the automobile (e.g, device 206). Moreover, the automobile 206, may communicate, authenticate and/or update the exchanged information with the data server 208 via the location processors 204, 204' and the wireless power link. Alternatively, the automobile 206 may be configured with cellular or other communication capabilities or may be configured to utilize the communication capabilities of the device 206' to communicate, authenticate and/or update the exchanged information with the data server 208 via the network 302. In another embodiment, the device 206' may execute a stored application to authenticate and link the device information associated with the device 206' to the device information associated with the device 206. The application may then be utilized to authenticate and link both the device 206 and the device 206' to the location information associated with the power supply 102 deployed within the parking structure 1300. It will be understood that the described cascade or nested configuration may be implemented for other types of vehicles such as, for example, boats and boat slips, or air planes and terminals.

The device 206 in another embodiment may be configured to communicate and cooperate with a wireless charging station 202 deployed or integrated in a hotel or home. As will be understood, after the device 206 is authenticated to the wireless charging station 202 of a hotel, location-specific information related to the hotel may be provided to the device 206 and/or an application executed by the device 206. For example, at check-in, the consumer 104 may access and communicate with the wireless charging station 202 and receive a location-specific locking code via the wireless power link. The location-specific locking code may, for example, control access to a room within the hotel, facilities within the hotel and/or services. Moreover, the location-specific information could include information regarding nearby restaurants, entertainment, services of other points of interest for travelers staying at the hotel.

Figure 9:
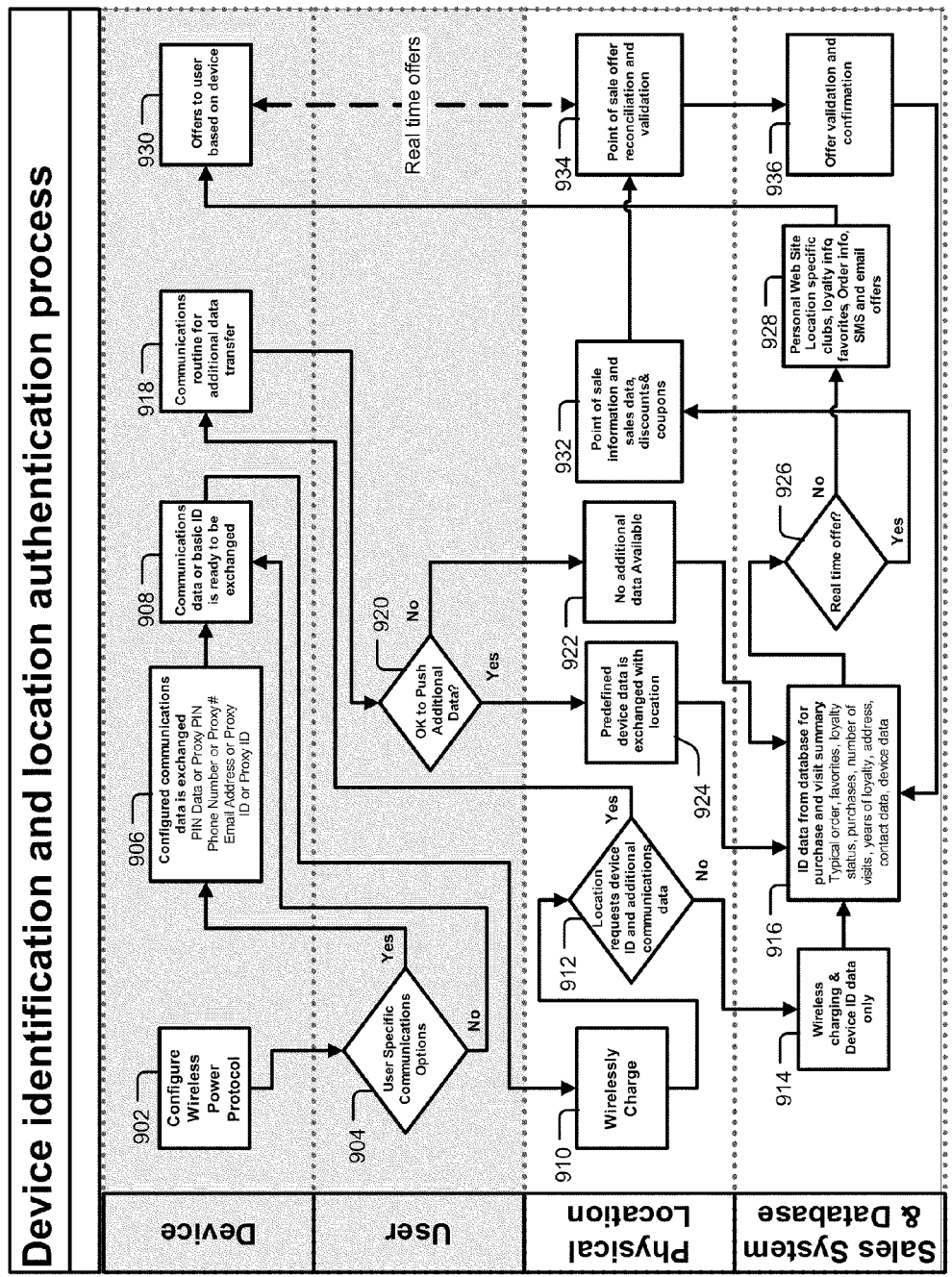
FIG. 9 illustrates an exemplary operational flow of a communications and charging network configured to provide location-specific.

FIG. 9 illustrates a device identification and authentication process 900 that may be implemented in accordance with the disclosure provided herein. At block 902, a device may be configured accordingly to a wireless power delivery protocol. For example, the device 206 may be configured with the necessary settings, passwords and/or permissions to establish a wireless power link 406 with the wireless charging station 202 deployed at the location 402.

At block 904, the consumer 104 may be prompted provide, via the device 204 or a web-based interface, passwords, account information and other authentication information. If authentication information is required and provided, then at block 906, data may be exchanged utilizing the provided personal identification number (PIN), identification information and/r proxy information. If authentication is not required, then at block 908, the device 206 is ready to exchange information or data based on the configuration established at block 902.

At block 910, a wireless power link may be established between the device 206 and the wireless charging station 202. The wireless power link may, in turn, transfer power from the wireless charging station 202 to the device 206.

At block 912, the wireless charging station 202 and the associate location processor 204 may request additional device information and/or identification as well as communication and security protocol information.

At block 914, if additional information is not required, wireless charging may continue based on the initially provided device identification information.

At block 916, the device identification information may be provided to the data sever 208 and/or the location processor 202 to update the virtual account associated with the consumer 10.

If additional information and communication is required, then at block 918, a communication routine or process may be authorized to transmit or provide the additional communications data gathered at block 906.

At block 920, the consumer 104 may be prompted to authorize the push communication of the additional communication data. If, at block 922, authorization is not provided, then no information is communicated and the process continues to block 916. If, at block 924, authorization is granted by the consumer 204, then the additional communication data, passwords, configuration information, etc may be pushed to, for example, the location processor 204 and/or the data server 208 and the process continues to block 916.

As previously discussed, at block 916, the device identification information, with or without the additional communication data, may be provided to the data sever 208 and/or the location processor 202 to update the virtual account information associated with the consumer 104.

At block 926, the data sever 208 and/or the location processor 202 determine whether an offer or other location-specific information may be communicated to the device 206 in real time. If no real time offer or update is available, then at block 928, the location-specific information may be provided to the virtual account associated with the consumer 104. Alternatively, the location-specific information may be communicated to the device 206 via, for example, a secure web page, a text or email message. At block 930, the non-real time offer and/or location-specific information may be received and displayed by the device 206. If a real time offer or update is available, then at block 932, the location-specific information may be provided to a point-of-sale device at the physical location 402 (see block 934). At block 936, the point-of-sale device may generate an offer validation and confirmation of the same may be communicated to the process at block 916 for recordation and updating of the location processor 202 and/or data server 208. Moreover, the real-time location-specific and/or location-specific information may be received and displayed by the device 206 as shown at block 930.

Figure 10:
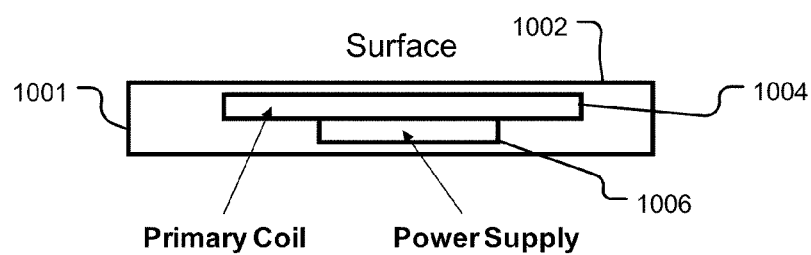
FIG. 10 illustrates an exemplary surface providing a wireless charge.

FIG. 10 illustrates an exemplary surface providing a wireless charge. The power supply equipment 202 may include a wireless charger 1001 with a surface 1002 that is adjacent a primary coil 1004 coupled with a power supply 1006. The power supply 1006 provides current to the primary coil 1004 for generating a magnetic field. When a device is disposed on or near the surface 1002, a charge is induced in a secondary coil in the device (not shown) from the primary coil 1004. In alternative embodiments, a single wireless charger 1001 may charge multiple devices. The power supply equipment 202 may include a single large wireless charger 1001 that charges multiple devices. The wireless charger 1001 may be, for example, located in auditorium seating, airport seating, train seating, airplane seating, fold down tables, or restaurant tables for providing a wireless charge. In particular, the wireless charger 1001 may be disposed in the armrest of one of the seats, such that the device is placed on or near the armrest surface for a wireless charge. Alternatively, other surfaces, such as a desktop, work surface, or table may also be equipped with the wireless charger 1001.

Figure 11:
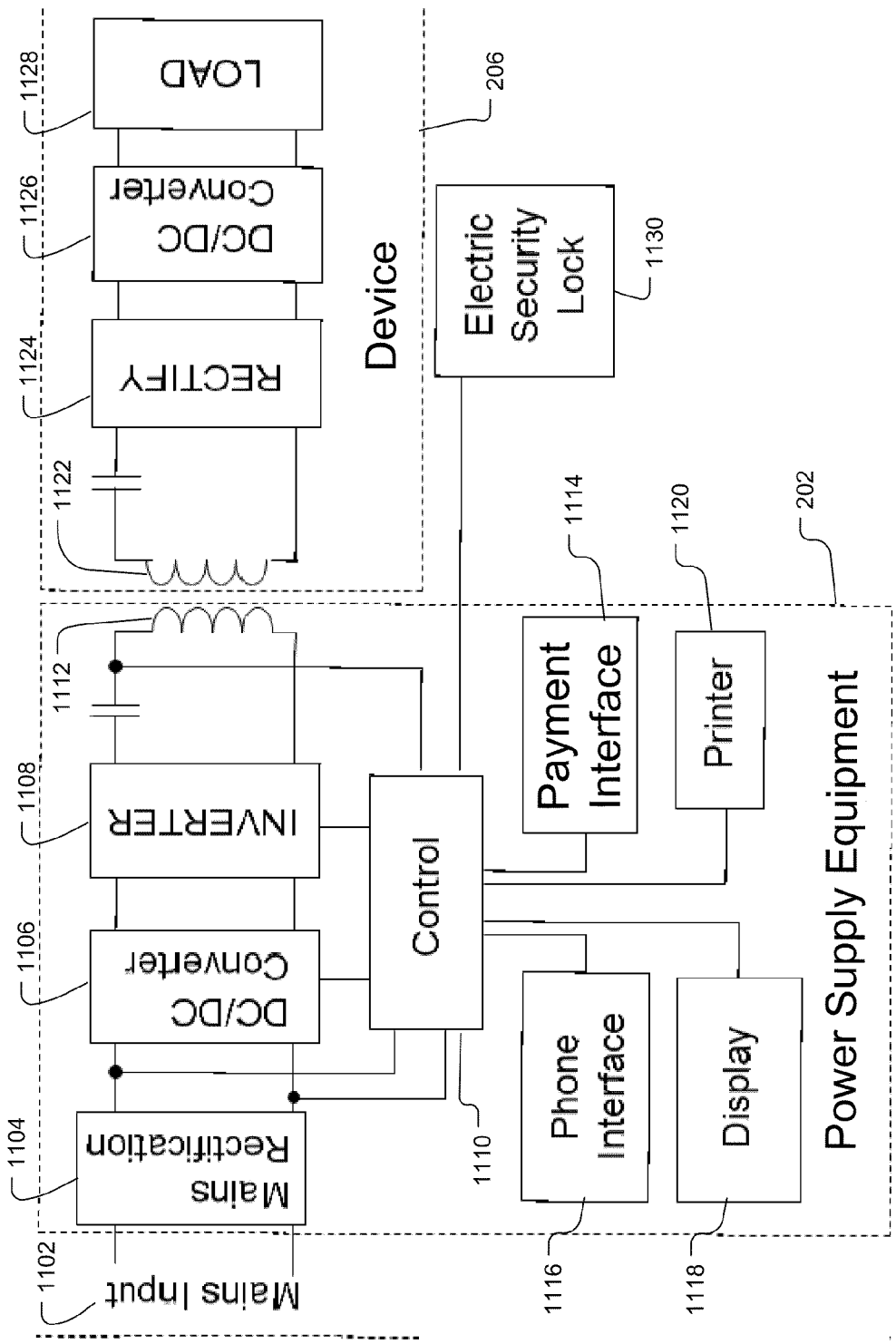
FIG. 11 illustrates an embodiment of a wireless power connection having an optional point-of-sale interface and an electronic security lock.

FIG. 11 illustrates a wireless power connection. Power from the power provider enters 1102 and is then rectified to DC by 1104. The power supply 1106 allows a variable power supply to alter the DC voltage required as selected by 1110. This information is passed from the device 206 through the wireless power link 1112. The capacitor adjacent to 1112 in the device 206 is optional depending on design considerations. Device limits, charge or power needs are transferred from the device 206 to the power supply equipment 202 using a simple control that varies the load 1128 by the device 206 control to allow detailed communications. This control may be the microprocessor located within the device and can switch an additional load or change the voltage level using 1126 to send information to the control 1110. Alternatively, the control 1110 may also alter the signal send through the wireless power link 1112 using the converter 1106 changing the voltage into the inverter 1108. A voltage or frequency input at 1122 or 1124 to the device 206 microprocessor control may allow this information to be decoded. Wireless power charging is further described in U.S. Pat. Pub. No. 2008/0079392, entitled "SYSTEM AND METHOD FOR INDUCTIVELY CHARGING A BATTERY," and U.S. Pat. Pub. No. 2007/0042729, entitled "INDUCTIVE POWER SUPPLY, REMOTE DEVICE POWERED BY INDUCTIVE POWER SUPPLY AND METHOD FOR OPERATING SAME," both of which are hereby incorporated by reference.

FIG. 11 shows the power supply equipment 202 inductively coupled with the device 206. In one embodiment, the device 206 is charged inductively by the power supply equipment 202. The power supply equipment 202 may include the wireless charger 1001 described with respect to FIG. 10. The power supply equipment 202 may receive main inputs 1102 of power. The power may be paid for by the power owner 108. The main input is rectified 1104 before going through a DC/DC converter 1106 and an inverter 1108. A control 1110 controls the incoming power and regulates the primary coil 1112. As described above with respect to FIG. 2, the billing processor 204 may be a separate component from the power supply equipment 202. Alternatively, the power supply equipment 202 may include a payment interface 1114 for receiving the payment from the consumer. The power supply equipment 202 may further include a phone interface 1116 for coupling with a cellular network. The phone interface 1116 may debit a consumer's minutes for charging of a cell phone device. A display 1118 may display for the consumer the elapsed time of the charging along with the current cost. Additional device and/or account information may be shown on the display 1118 to the consumer. A printer 1120 may print out a receipt for bill payment and/or print out a code (such as a PIN) for retrieving a charging device.

The device 206 may include a secondary coil 1122 disposed adjacent or near the primary coil 1112 for generating a current that passes through a rectifier 1124 and a DC/DC converter 1126. The wireless inductive transfer between the power supply equipment 202 and the device 206 feeds a load 1128 that is charged by the power supply equipment 202. As discussed above with respect to the lockers 702 in FIG. 7, an electric security lock 1130 may secure the device 206 to prevent access except for the device owner. The electric security lock 1130 may require a code, PIN, or other identifying material for access to the device.

Figure 12:
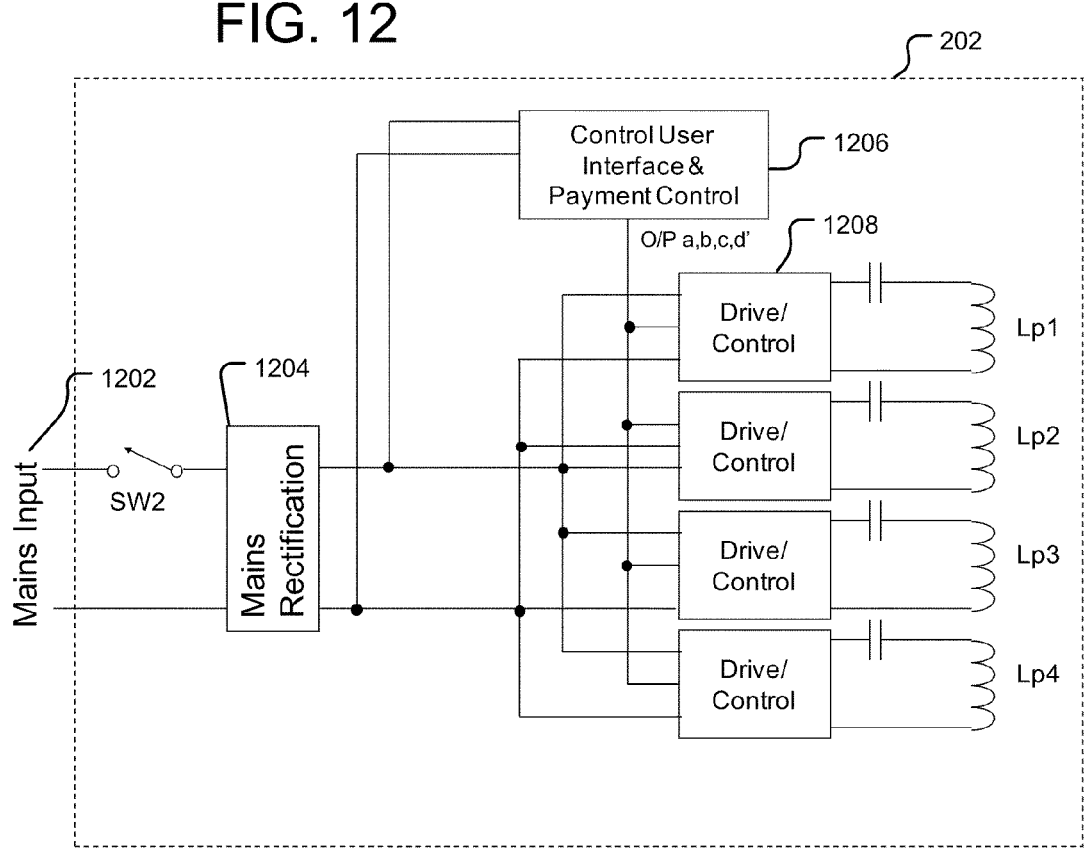
FIG. 12 illustrates alternative wireless power supply equipment.

FIG. 12 illustrates alternative wireless power supply equipment 202. The components in the power supply equipment 202 may be similar to the power unit illustrated in FIG. 11. The power supply equipment 202 may include a control that powers four wireless power devices with one controller 1206. This system may be easily scaled to as many units as required for an installation by adding drive controls 1208 as system speed allows or adding parallel systems as required. The main input 1202 is received and passed through a rectifier 1204. A control user interface 1206 may monitor/control the charging that is provided by the coils Lp1, Lp2, Lp3, and Lp4. Each of the coils may be coupled with a separate drive/control 1208 that pass current through the coils. The power supply equipment 202 illustrated in FIG. 12 may configured to charge multiple devices simultaneously with the plurality of coils. The controller 1206 multiplexes monitoring each of the drive controls 1208. The drive control to the coil Lpx is handled by each drive control 1208 respectively, in order to share processing requirements. The controller 1206 may maintain communications and basic power parameters for each of the controls 1208 while the controller 1206 drive controls each coil Lp1-Lp4 respectively.

In one embodiment, the wireless power may be transferred to a device automatically with limited or no user interaction. For example, when a consumer with his/her device enters into a wireless charge area, the device may automatically begin receiving wireless power after the device or account is identified and a form of payment is verified. The device may identify itself to the wireless charge system. The wireless charge area may include the range that the wireless power is available over. When the device is within range, it may automatically receive power until it is fully charged, at which time, it may stop receiving power. Alternatively, this automatic charging may request confirmation from the consumer on whether the device should be wirelessly charged. For example, an SMS communication/response or other validation may be required on the device or at a source of the wireless power in order to begin the wireless power transfer. The device may detect that it is within the wireless power range and provide a Yes/No option for the consumer to decide whether to receive wireless power to the device. The validation may also include the price that must be paid for the wireless power.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized.

The disclosed embodiments provide an accurate and reliable mechanism by which a device's physical location or presence may be determined via the one to one wireless coupling of the device with a power source whose location and parameters are known. The disclosed embodiments may be utilized in any application where such information may be used to augment an existing service or provide a new service via the device or otherwise. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A wireless charging system comprising:
a detector configured to identify device information related to a device to be powered at a location;
a location processor coupled with the detector and configured to deliver location-specific information to the device to be powered, wherein the location-specific information is related to the location of the device to be powered and is based on the identified device information; and
a power supply in communication with the location processor configured to wirelessly provide power to the device to be powered based on the detected device information;
wherein the location processor is configured to deliver the location-specific information to the device to be powered via a first channel, and further wherein the power supply is configured to wirelessly provide power to the device to be powered via a second channel.

2. The wireless charging system of claim 1, wherein the first and second channels are wireless inductive channels.

3. The wireless charging system of claim 1, wherein the first channel is a wireless communication channel selected from the group consisting of: a Wi-Fi channel, a cellular channel, and a Bluetooth channel.

4. The wireless charging system of claim 1 further comprising:
an authentication processor configured to verify the device information,
wherein the authentication processor is coupled to the detector and receives the device information from the detector, and wherein the authentication processor directs the location processor to deliver the location-specific information.

5. The wireless charging system of claim 4, wherein the authentication processor verifies the device information and location information received from the location processor against a virtual account.

6. The wireless charging system of claim 1, wherein the power supply is an induction power supply.

7. The wireless charging system of claim 1, wherein the power supply is disposed in an armrest of a chair and the device is charged when placed adjacent the armrest.

8. In a non-transitory computer readable storage medium having stored therein data representing instructions executable by a programmed processor configured to control a wireless charging station, the storage medium comprising instructions operative for:
receiving, at the wireless charging station, device information from a device;
identifying the device based on both the received device information and a virtual account associated with the device; and
communicating, from the wireless charging station, location-specific information to the device via a wireless connection established by the wireless charging station wherein the location-specific information is related to a location of the device at the wireless charging station.

9. The computer readable storage medium of claim 8, wherein the virtual account includes customer account information.

10. The computer readable storage medium of claim 8, wherein the virtual account includes a user virtual account and a location virtual account.

11. The computer readable storage medium of claim 8, wherein the wireless connection is a connection selected from the group consisting of: a cellular connection, a Wi-Fi connection, a Bluetooth connection and an inductive power connection.

12. The computer readable storage medium of claim 8, wherein the location-specific information is information selected from the group consisting of: product information, loyalty information, and point-of-sale offers.

13. The computer readable storage medium of claim 8 further comprising:
authenticating the received device information against information stored in the virtual account.

14. The computer readable storage medium of claim 13, wherein authenticating the received device information includes receiving a password from the device.

15. The computer readable storage medium of claim 8 further comprising:
automatically establishing a connection between the device and the wireless charging station when the device is within range of the wireless charging station.

16. A method for providing a wireless charge comprising:
storing user account information in a virtual account, wherein the user account information includes a device identification;
receiving a request for a wireless charge from a device at a wireless charging station deployed at a location;
communicating the device information to the wireless charging station;
verifying the received device information against the stored device information in the virtual account;
communicating, from the wireless charging station, location-specific information to the device based on the received device information, wherein the location-specific information is related to the location;
providing wireless power to the device; and
updating the virtual account to reflect the communicated location-specific information.

17. The method of claim 16, wherein the location-specific information is information selected from the group consisting of: product information, loyalty information, and point-of-sale offers, each of which is specific to the location.

18. The method of claim 16 further comprising:
authenticating the received device information against information stored in the virtual account.

19. The method of claim 18, wherein authenticating the received device information includes receiving a password from the device.

20. The method of claim 16 further comprising:
automatically establishing a connection between the device and the wireless charging station when the device is within range of the wireless charging station.

21. The method of claim 16, wherein verifying the received device information against the stored device information in the virtual account includes authenticating the device information against a location stored in the virtual account.

22. The method of claim 21, wherein the authenticated device and location information cooperate to access a door lock.

23. The method of claim 16 further comprising:
receiving a second request for the wireless charge from a second device at a second wireless charging station;
communicating device information associated with the second device to the second wireless charging station; and
providing wireless power to the second device via the second wireless charging station.

24. The method of claim 23 further comprising:
appending the second device information to the device information;
communicating the appended device information to the wireless charging station; and
updating the virtual account to reflect the communicated appended device information.

* * * * *